(12) United States Patent
Mak et al.

(10) Patent No.: US 11,966,081 B2
(45) Date of Patent: Apr. 23, 2024

(54) OPTICAL SUBASSEMBLY FOR NON-RECIPROCAL COUPLING OF LIGHT AND ASSEMBLY PROCESS THEREOF

(71) Applicant: Cloud Light Technology Limited, Hong Kong (HK)

(72) Inventors: Wing Keung Mark Mak, Hong Kong (HK); Vincent Wai Hung, Hong Kong (HK)

(73) Assignee: Cloud Light Technology Limited, Hong Kong (HK)

( * ) Notice: Subject to any disclaimer, the term of this patent is extended or adjusted under 35 U.S.C. 154(b) by 12 days.

(21) Appl. No.: 16/928,051

(22) Filed: Jul. 14, 2020

(65) Prior Publication Data

US 2022/0019027 A1    Jan. 20, 2022

(51) Int. Cl.
*G02B 6/42* (2006.01)
*G02B 6/26* (2006.01)
*G02B 6/36* (2006.01)

(52) U.S. Cl.
CPC .............. *G02B 6/26* (2013.01); *G02B 6/36* (2013.01); *G02B 6/42* (2013.01); *G02B 6/4245* (2013.01)

(58) Field of Classification Search
CPC .. G02B 6/3874; G02B 6/4245; G02B 6/4244; G02B 6/4234
See application file for complete search history.

(56) References Cited

U.S. PATENT DOCUMENTS

| | | | | |
|---|---|---|---|---|
| 5,737,349 A | * | 4/1998 | Gaebe | G02F 1/093 372/20 |
| 7,275,877 B2 | * | 10/2007 | Go | G02B 6/4201 385/88 |
| 2004/0223692 A1 | * | 11/2004 | Tallone | G02B 6/30 385/34 |
| 2007/0133928 A1 | * | 6/2007 | Ko | G02B 6/4215 385/88 |
| 2007/0189677 A1 | * | 8/2007 | Murry | G02B 6/4279 385/92 |
| 2016/0202420 A1 | * | 7/2016 | Paquet | G02B 6/30 385/36 |
| 2020/0233161 A1 | * | 7/2020 | Chen | G02B 6/4239 |
| 2020/0251610 A1 | * | 8/2020 | Dülk | H04N 9/315 |
| 2020/0319415 A1 | * | 10/2020 | Hung | G02B 6/4245 |
| 2020/0328814 A1 | * | 10/2020 | Luo | H04B 10/67 |
| 2023/0152537 A1 | * | 5/2023 | Witzens | G02B 6/34 385/33 |

FOREIGN PATENT DOCUMENTS

CN         210605074 U  *  5/2020  ........... G02B 6/4204

* cited by examiner

*Primary Examiner* — Eric Wong
(74) *Attorney, Agent, or Firm* — Harrity & Harrity, LLP

(57) ABSTRACT

An optical subassembly for non-reciprocal coupling of light from a planar optical waveguide output outside the optical subassembly to an optical fiber includes a carrier configured to support the optical subassembly, an optical fiber fixed to the optical subassembly, a focusing optical system consisting two foci with one focus coincident with the input of optical fiber, an optical isolator to transmit light unidirectionally between two foci, an input boundary provided by the carrier to align the optical subassembly with the planar optical waveguide output. In particular, the optical subassembly is operably configured to provide a low transmission loss for light traveling from the planar optical waveguide output to the optical fiber.

6 Claims, 9 Drawing Sheets

OPTICAL SUBASSEMBLY FOR NON-RECIPROCAL COUPLING OF LIGHT AND ASSEMBLY PROCESS THEREOF

FIELD OF THE INVENTION

The present invention relates generally to an optical transceivers of optical communication systems. In particular relates to an optical subassembly for non-reciprocal coupling of light from a planar optical waveguide output to an optical fiber and an assembly process thereof.

BACKGROUND OF THE INVENTION

In the era of information, there is no doubt that internet traffic has an exponential growth through the modern communication systems. Optical fiber communication plays a vital role in the development of high-performance and high-capacity telecommunication systems. In particular, the optical fiber transmission is instrumental in the development of many advanced applications in telecommunications and data communications. Moreover, in cloud computing, wireless network and data center equipment migrate to higher data rate, density and energy efficiency since they were in service to cope with exploding demand for data communication. As part of the communication infrastructure, optical transceivers in the physical layer plays an essential role to enable target system performance meets. Like in electronic packaging technology for microelectronic, photonic integrated circuit (PIC) packaging for optical transceivers continuously shrink in size, increase function and device variety, reduce in power consumption per bandwidth and increase in data-rate in the past decade. One of the keys is the adoption of silicon photonic (SIP) in transceiver, a high density member in PIC family, that allow large-scale photonic integration with electronic. It is expected the gradual expansion of silicon photonic (SIP) in photonic packaging will support the communication industry in coming decades.

There are two major functions of silicon photonic (SIP) in the optical transceiver. One of the functions is to convert electrical data to optical signals (the transmitter or Tx) and vice versa (the receiver or Rx). Physical properties of silicon, in particular, make it a very efficient platform to integrate various devices including optical splitter, modulator, photodiode, phase shifter, wavelength multiplexer/demultiplexer and edged coupler (a type of mode size converter) in large-scale by wafer fabrication. As of today, except the laser light source, all Tx and Rx functions can be built on an unprecedented small size silicon photonic (SIP) chip. That make it an irreplaceable choice for high density photonic packaging.

Despite of advantages can be obtained with SIP, light carrying signal after leaving SIP Tx is necessary to couples into fiber in order to transmit in communication system for meaning distance. Whereas the input and output interface engineering of SIP to fiber is still at an early stage for industrial application compare to other functions. In any optical system, light power to be transmitted with certain range to ensure signal can be properly detected at receiver. Typically, fiber butt-coupling or optical coupling is required to obtain sufficient optical power from SIP to the system, via one of two commonly used input/output (IO) coupling port of SIP, namely, grating coupler and edged coupler. Grating coupler efficiency is known to have strong dependent on wavelength and polarization. It is favorable choice for academic and product application where optimized coupling efficiency and broadband performance is not important. Whereas edged coupler offers stable over wider wavelength range and in general higher coupling efficiency with conventional single mode fiber make it the preferable choice for many product applications. Hence, in coming paragraphs, discussions will be focused on edged coupler only.

Beside the efficient of coupling, edged coupler offers an additional advantage that is lower optical back reflection that is essential for SIP signal quality. Tx signal is sensitive to optical back reflection along the transmission path owning to the coherent nature of laser light. Reflection from either the SIP and optical fiber coupling or reflection point away from the transceiver can cause increase in intensity noise, wavelength shifts or mode hopping that lead to transceiver function failure.

In SIP, different optical functional devices are connected by silicon waveguide fabricate by using CMOS compatible microelectronic wafer fabrication process. Light transmitting in silicon waveguide is confined within waveguide core, typically with size of few hundred nanometer surrounds by silicon dioxide. Such buried wave guiding structure give light intensity distribution, known as mode size, is also few hundred nanometer in diameter. Usually, on chip spot size conversion is employed to gradually expanse the size of the light spot to few micrometers by edged coupler before it is suitable to interface with micro optics or direct but couple with fiber. On the other hand, most commonly use fiber in optical communication is the step-index single mode fiber (e.g. SMF28) in which mode size is nine and ten micrometers in diameter for O-band and C-band communication wavelength respectively. As of today, edged coupler that can use to direct butt couple with fiber is still an emerging development area for academic and industrial because it will enable a highly integrated in-situ solution that has high commercial value.

FIG. 1A is a typical SIP mode size converter in accordance with one prior art. The converter expands light intensity profile by using invert-taper waveguide structure that allow adiabatic change in mode size when light propagate along it. However, direct butt-coupling to SMF28 fiber with low coupling loss not fully realized yet because the expanded spot size cannot well match to that of the fiber. More complicated structure than Prior art by hetero-material optical waveguide material (e.g. Si3N4) overlaid on silicon waveguide or suspension type mode-conversion structure can further improve coupling efficiency at the expense of more wafer fabrication process. Recent report from an IEMC, a silicon photonic foundry, announced in ECCO2019 their edge coupler on a hybrid Si/SiN photonic platform achieved −1.5 dB/fiber butt coupling efficiency to SMF28 fiber.

Other than butt coupling, few micrometers SIP edged coupler mode size can also be magnified to ten nanometers to match with fiber by free space optics such as by using micro lens. FIG. 1B is a mode size converter having a first end and a second end in accordance with another prior art. In particular, the mode-conversion by optical magnification and choice of free-space optics are flexible to accommodate SIP mode-size to match with fiber fully. Micro-optics for coupling offer another advantage over fiber butt-couple with SIP is that it allows the use of optical isolator between SIP and fiber to preventing backward travelling light goes into the edged coupler.

Thus, the present invention is aimed to provide an optical subassembly for non-reciprocal coupling of light from a planar optical waveguide output to an optical fiber that overcomes the above-discussed drawbacks of the conventional optical subassemblies. In particular, the optical subassembly is robust in design with inexpensive optical components. Moreover, the optical subassembly provides a low transmission loss for light travelling from the PIC, more especially the SIP, to the optical fiber and prevents light propagation in the reverse direction.

SUMMARY OF THE INVENTION

Embodiments of the present disclosure relates to an optical subassembly for non-reciprocal coupling of light from a planar optical waveguide to an optical fiber. In particular, the optical subassembly includes a focusing optical system operably configured to collect and focus the light to the optical fiber, an optical fiber fixed to the optical subassembly, an optical isolator operably configured to provide a unidirectional transmission of the light, an input focus of the focusing optical system aligns to input boundary of the optical subassembly. Particularly, the optical subassembly is operably configured to provide a low transmission loss for light traveling from the planar optical waveguide output to the optical fiber. A carrier is configured to support the optical subassembly.

In accordance with an embodiment of the present invention, the planar optical waveguide output waveguide is anyone of a silicon photonic (SIP) and a photonic integrated circuit (PIC) output.

In accordance with an embodiment of the present invention, the focusing optical system further includes a first focusing lens and a second focusing lens.

In accordance with an embodiment of the present invention, the first focusing lens and a second focusing lens forms an optical coupling assembly. Particularly, the optical focusing assembly is operably configured to collect and focus the light to the optical fiber. In accordance with an embodiment of the present invention, the input boundary is further configured to align the input focus with an optical subassembly boundary.

In accordance with an embodiment of the present invention, one of the two foci coincident with optical input. In accordance with an embodiment of the present invention, the optical isolator is a free-space optical isolator. In accordance with an embodiment of the present invention, the optical isolator is positioned between two foci of the focusing system for providing a nonreciprocal unidirectional transmission of the light.

In accordance with an embodiment of the present invention, the second focusing lens is anyone of a lensed fiber, a C-lens, a GRIN-lens.

In accordance with an embodiment of the present invention, the second focusing lens is configured to the optical fiber input. In accordance with an embodiment of the present invention, the optical subassembly further comprises a light-transmitting window with a light input plane and a hollow tube.

In accordance with an embodiment of the present invention, anyone focusing element selected from the first focusing lens and the second focusing lens of the focusing optical system is configured with the light-transmitting window.

In accordance with an embodiment of the present invention, the carrier is in anyone shape selected from a hollow tube, a U-shape, an L-shape, and alike shape carrier. In accordance with an embodiment of the present invention, a mode size of planar optical waveguide output is magnified to match with that of the optical fiber by the first focusing lens and a second focusing lens.

In accordance with an embodiment of the present invention, the optical subassembly with a 3-micrometer mode field diameter edged coupler of silicon photonic (SIP) waveguide output to SMF28 fiber has a coupling efficiency of better than 71% for 1311 nm light.

Another embodiment of the present invention relates to an assembly process of an optical subassembly for nonreciprocal coupling of light from a planar optical waveguide output of a silicon photonic (SIP) to an optical fiber. The assembly process including the steps of fixing focusing optical components of the optical subassembly at target location on the carrier, align a diverging light source to the input boundary of the optical subassembly, adjust the diverging light source position and angle of incident so that most optical power pass through first and second focus of the focusing optical system, deposit an optical isolator between two foci of the optical subassembly, fixing a fiber to the carrier so that the fiber input coincident with the second focus of the optical subassembly. In particular, the optical subassembly is operably configured to provide a low transmission loss for light travel from the planar optical waveguide output to the optical fiber.

In accordance with an embodiment of the present invention, the assembly process further includes focusing a diverging light source to an optical fiber facet center by a focusing lens and magnifying a mode size of planar output waveguide to an output waveguide of the optical fiber by the first focusing lens and the second focusing lens.

In accordance with an embodiment of the present invention, the assembly process further includes connecting anyone focusing element selected from the first focusing lens and the second lens of the focusing optical system with a light-transmitting window at a light exit side and supporting the optical subassembly on a hollow tube.

The foregoing objectives of the present invention are attained by employing optical subassembly and incorporating an assembly process for the optical subassembly for non-reciprocal coupling of light from a planar optical waveguide output to an optical fiber.

BRIEF DESCRIPTION OF THE DRAWINGS

So that the manner in which the above recited features of the present invention is be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

ELEMENT LIST

101—First focusing lens
102—Second focusing lens
103—Optical Isolator
104—Input boundary
105—Input focus
106—Fiber
107—Carrier
108—Light transmitting window
109—Fiber capillary
110—Assembly body

DETAILED DESCRIPTION

Various embodiments of the present invention provide an optical subassembly for non-reciprocal coupling of light from a planar optical waveguide output to an optical fiber and an assembly process thereof.

The principles of the present invention and their advantages are best understood by referring to FIG. 1 to FIG. 7. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1A:
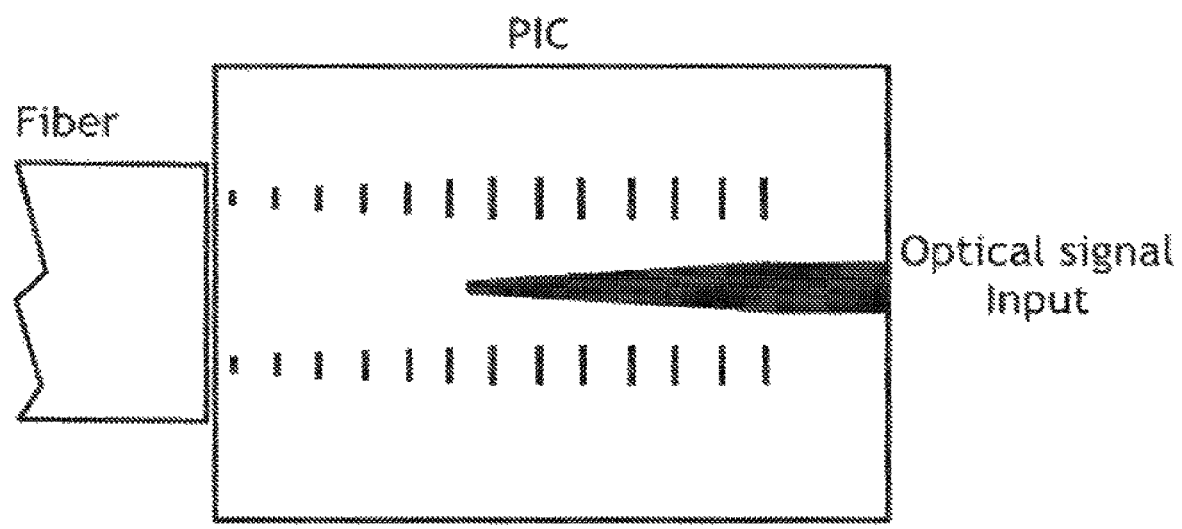
FIG. 1A is a photonic integrated circuit (PIC) mode size converter in accordance with one prior art.
Figure 1B:
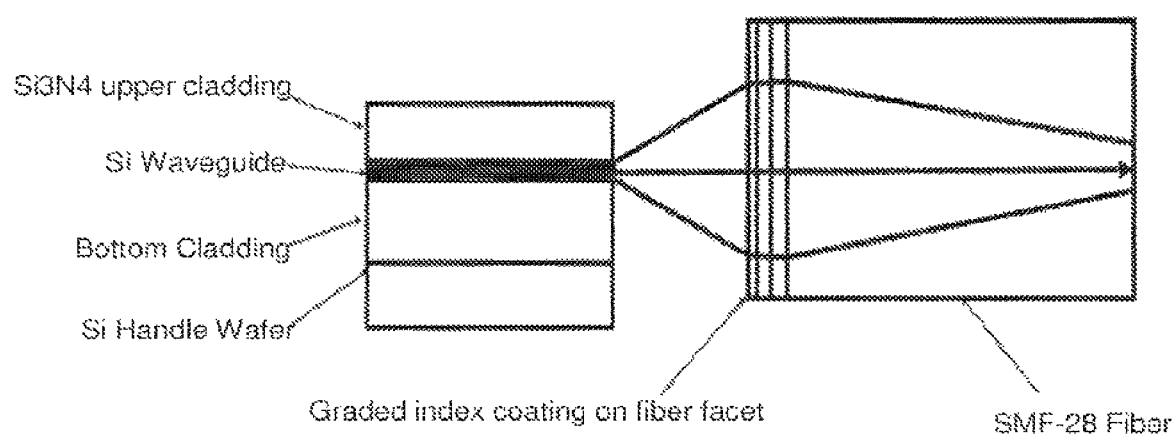
FIG. 1B is a mode size converter having a first end and a second end in accordance with another prior art.
Figure 1C:
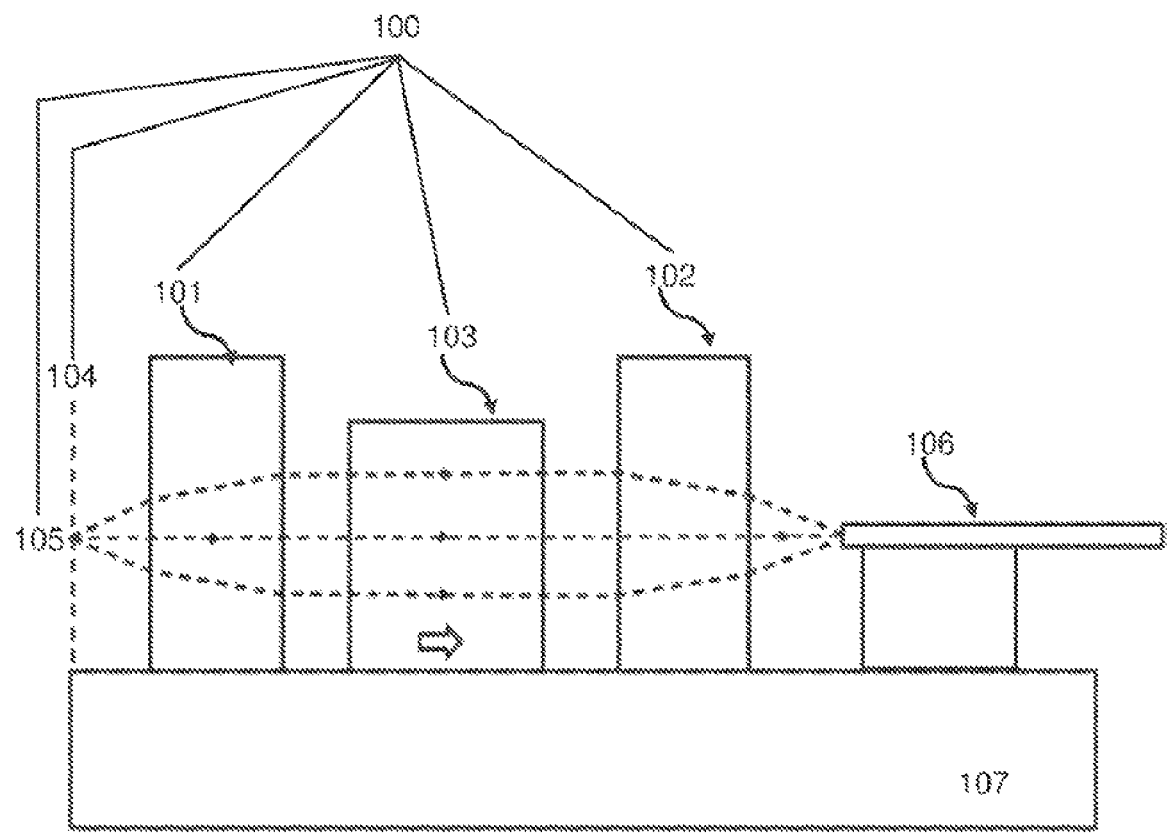
FIG. 1C illustrates a pictorial representation of an optical subassembly for nonreciprocal coupling of light in accordance with one embodiment of the present invention.

FIG. 1C illustrates a pictorial representation of an optical subassembly for nonreciprocal coupling of light in accordance with one embodiment of the present invention. In particular, the optical subassembly (100) includes the first focusing lens (101), second focusing lens (102), optical isolator (103), input boundary (104), input focus (105), optical fiber (106). In particular, the optical subassembly is operably configured to provide a low transmission loss for light traveling from the planar optical waveguide output to the optical fiber. Moreover, the optical subassembly is further configured to perform a unidirectional transmission of light.

In particular, the focusing optical system formed by first focusing lens (101) and second focusing lens (102) is operably configured to collect and focus the light to the optical fiber (106), the optical fiber (106) is fixed to the optical subassembly (100), the optical isolator (103) is operably configured between two foci of the optical focusing system to provide an unidirectional transmission of the light, a carrier (107) is configured to support the optical subassembly (100), the input focus (105) is configured to align with the input boundary (104) provided by the carrier (107).

In accordance with an embodiment of the present invention, the focusing optical system further includes the first focusing lens (101) and a second focusing lens (102). Particularly, the first focusing lens (101) and a second focusing lens (102) forms an optical coupling assembly. Moreover, the optical focusing assembly is operably configured to collect and focus the light to the optical fiber (106). Furthermore, the optical coupling assembly provides a focus location for the input focus to align in the same plane with the optical subassembly boundary.

In accordance with an embodiment of the present invention, one of the two foci coincident with a fiber optical input.

In accordance with an embodiment of the present invention, the optical planar waveguide output is anyone of a silicon photonic (SIP) output and a photonic integrated circuit (PIC) output. In particular, the mode size of planar optical waveguide output is magnified to matched with that of the optical fiber by the first focusing lens (101) and the second focusing lens (102).

In accordance with an embodiment of the present invention, the optical isolator is a free-space optical isolator. In particular, the optical isolator is positioned between two foci of the focusing optical system for providing a nonreciprocal unidirectional transmission of the light.

In one or more embodiments of the present invention, the optical isolator operates on the magneto-optic effect with either polarizers or a birefringent optics in order to prevent light travelling in backward direction.

In accordance with an embodiment of the present invention, the optical subassembly further comprises a light-transmitting window with a light input plane and a hollow tube. In particular, at least one focusing element of the focusing optical system is configured with the light-transmitting window. Moreover, the focusing element is selected from the first focusing lens and the second focusing lens.

In accordance with an embodiment of the present invention, the input boundary is further configured to align the input focus with an optical subassembly boundary. Also, the input boundary provides a reference plane for an optical subassembly boundary to align with the planar optical waveguide.

Figure 2:
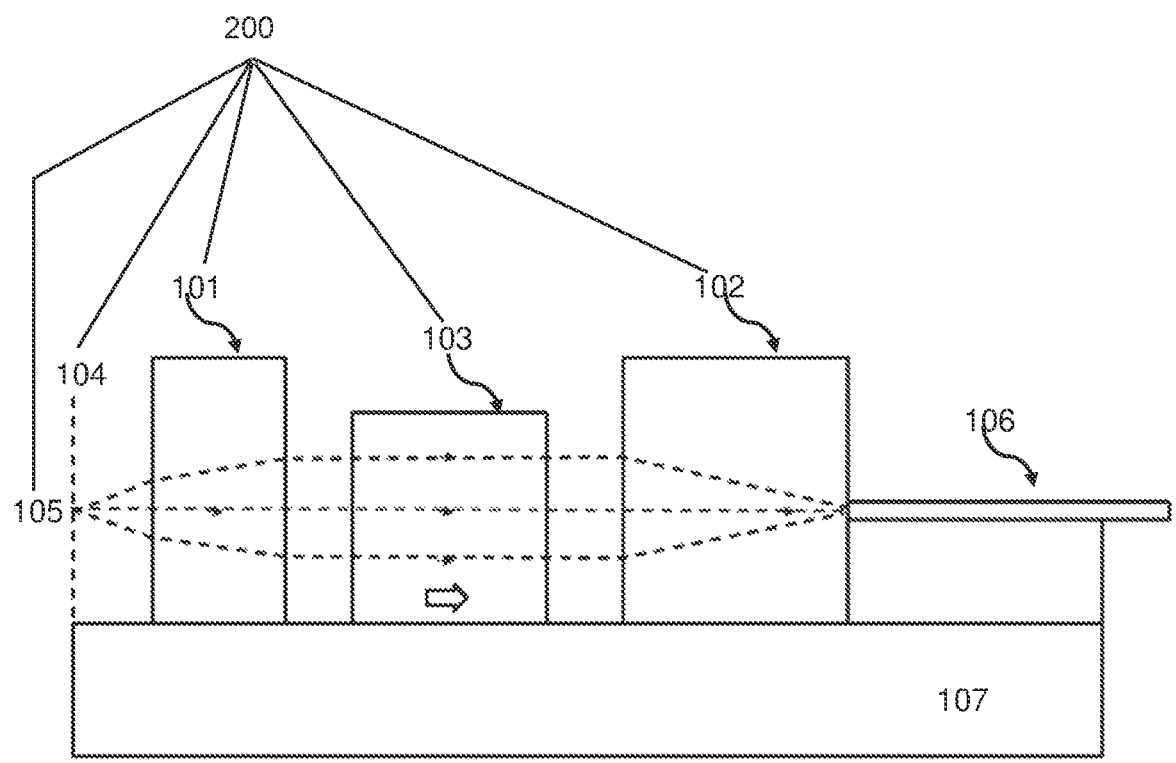
FIG. 2 illustrates a pictorial representation of an optical subassembly for nonreciprocal coupling of light in accordance with another embodiment of the present invention.

FIG. 2 illustrates a pictorial representation of an optical subassembly for nonreciprocal coupling of light in accordance with another embodiment of the present invention. In particular, the optical subassembly (200) includes the first focusing lens (101), second focusing lens (102), optical isolator (103), input boundary (104), input focus (105), optical fiber (106), all supported by a carrier (107). Moreover, the optical fiber input is in contact with the second focusing lens (102) of the focusing optical system. Furthermore, the second focusing lens (102) is anyone of a lensed fiber, a C-lens and a GRIN-lens. Subsequently, the second focusing lens (102) aligns to optical fiber (106) in three axis alignment. Also, the second focusing lens (102) is configured to the optical fiber input.

Figure 3:
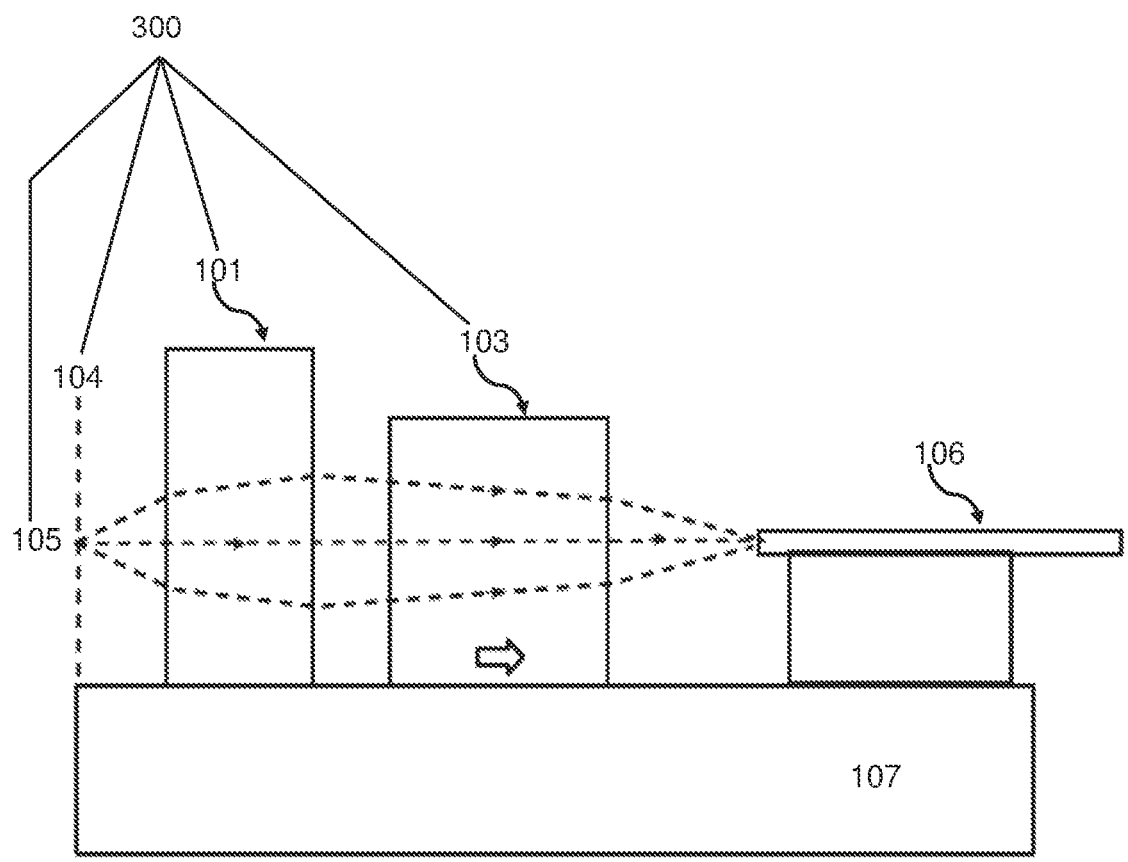
FIG. 3 illustrates a pictorial representation of an optical subassembly for nonreciprocal coupling of light in accordance with yet another embodiment of the present invention.

FIG. 3 illustrates a pictorial representation of an optical subassembly for nonreciprocal coupling of light in accordance with yet another embodiment of the present invention. In particular, the optical subassembly (300) includes the first focusing lens (101), optical isolator (103), input boundary (104), input focus (105), optical fiber (106), all supported by a carrier (107). Moreover, the first focusing lens (101) of the focusing optical system is configured for collecting and focusing the light to the optical fiber (106). Moreover, the beam passing the optical isolator (103) is a conventional latched garnet isolator. Furthermore, the first focusing lens (101) of the focusing optical system and an optical fiber (106) are in contact with the optical isolator (103) to provide non-reciprocal coupling of the light from a planar optical waveguide output to an optical fiber (106).

Figure 4:
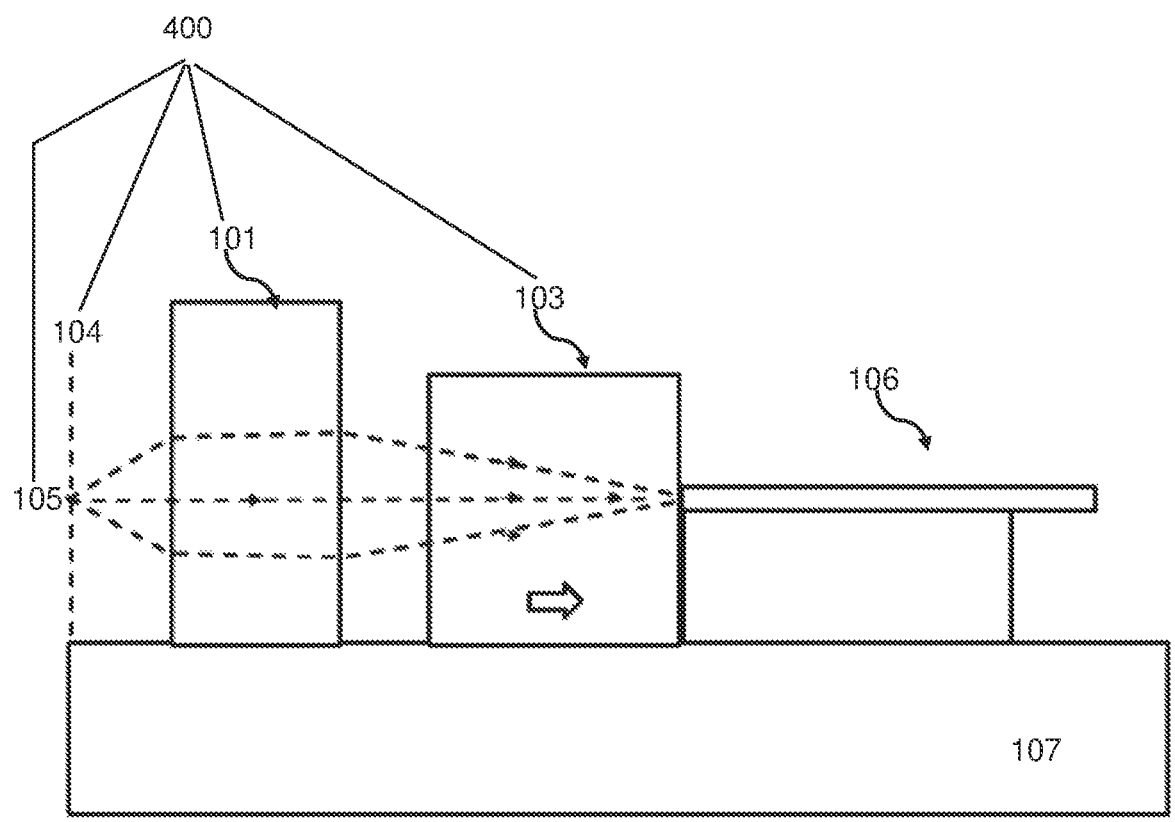
FIG. 4 illustrates a pictorial representation of an optical subassembly for nonreciprocal coupling of light in accordance with yet another embodiment of the present invention.

FIG. 4 illustrates a pictorial representation of an optical subassembly for non-reciprocal coupling of light in accordance with yet another embodiment of the present invention. In particular, the optical sub assembly (400) includes the first focusing lens (101), optical isolator (103), input boundary (104), input focus (105), optical fiber (106), all supported by a carrier (107). Moreover, the first focusing lens (101) of the focusing optical system and an optical fiber (106) are in contact with the optical isolator (103) to provide non-reciprocal coupling of the light from a planar optical waveguide output to an optical fiber (106).

Figure 5:
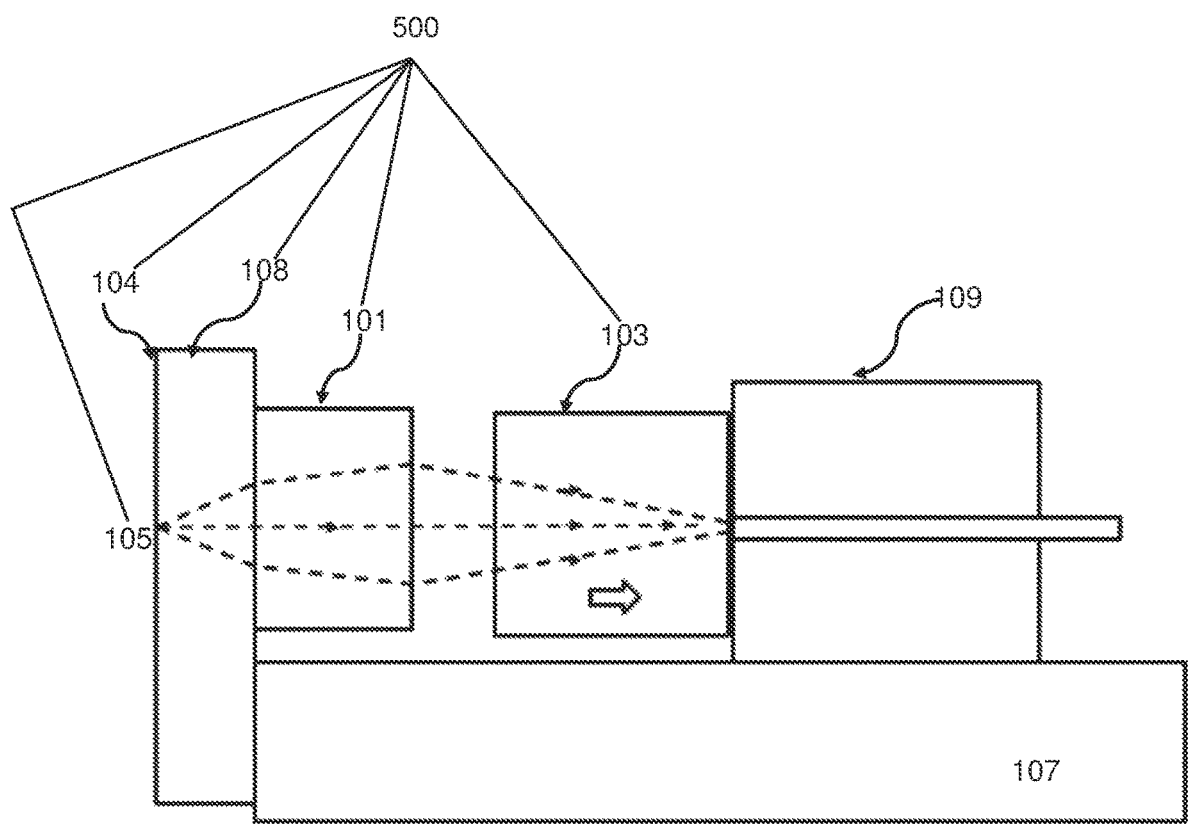
FIG. 5 illustrates a pictorial representation of an optical subassembly having a light input plane provided by a light-transmitting window in accordance with yet another embodiment of the present invention.

FIG. 5 illustrates a pictorial representation of an optical subassembly having a light input plane provided by a light-transmitting window in accordance with yet another embodiment of the present invention. In particular, the optical subassembly (500) includes the first focusing lens (101), optical isolator (103), input boundary (104), input focus (105), optical fiber capillary (109), and a light transmitting window (108), all supported by a carrier (107). Moreover, the first focusing lens (101) of the focusing optical system is in contact with the light exit side of the light transmitting window (108). Furthermore, a single focusing element of the focusing optical system is configured with the light transmitting window (108). Also, the optical subassembly (500) allows better control in the focusing lens angle and enhances the stability of coupling from a planar output waveguide to the optical fiber.

Figure 6:
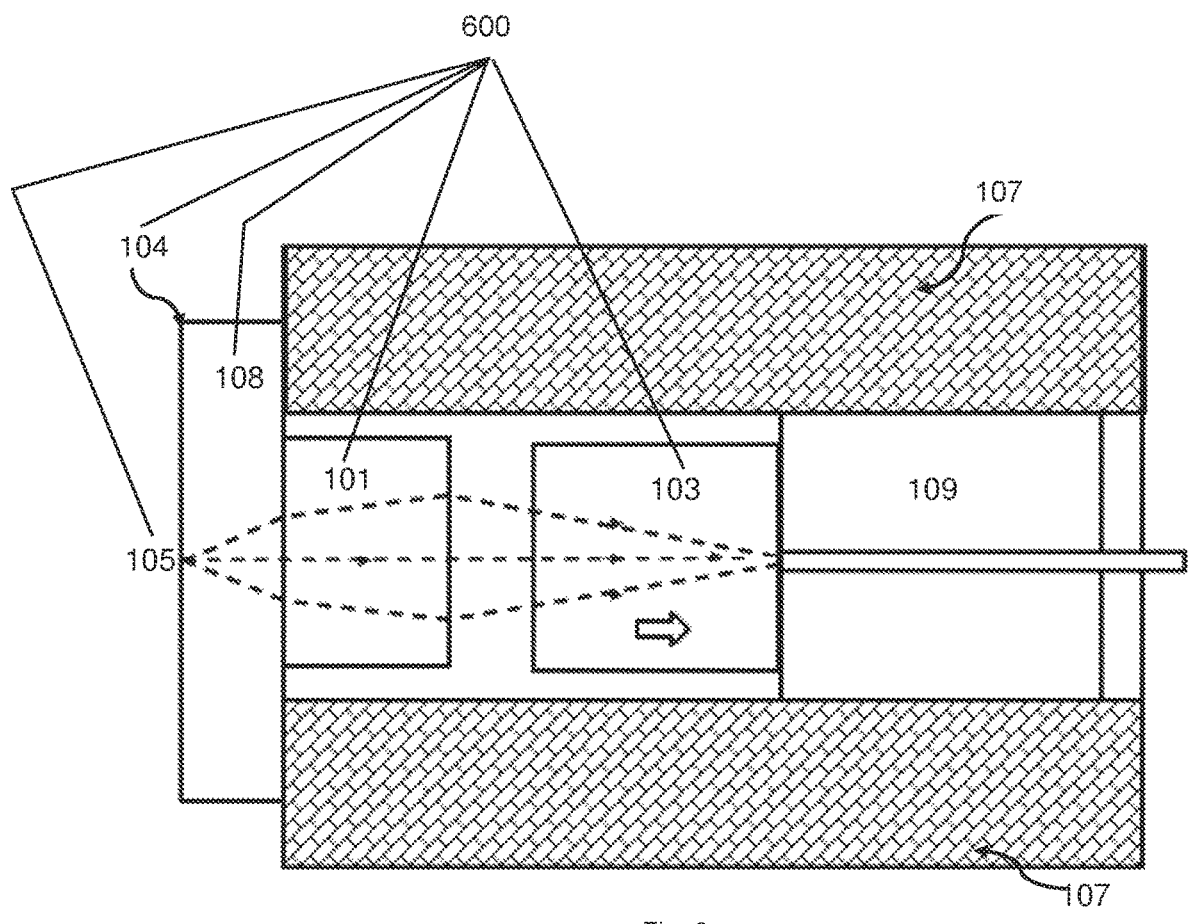
FIG. 6 illustrates a pictorial representation of an optical subassembly having a light input plane provided by a light-transmitting window in accordance with yet another embodiment of the present invention.

FIG. 6 illustrates a pictorial representation of an optical subassembly having a light input plane provided by a light-transmitting window in accordance with yet another embodiment of the present invention. In particular, the optical subassembly (600) includes the first focusing lens (101), optical isolator (103), input boundary (104), input focus (105), optical fiber capillary (109), a light transmitting window (108) and an assembly body (110), all supported by a carrier (107). The single focusing lens of the focusing optical system in contact with the light exit side of the light transmitting window (108). Moreover, the optical subassembly (600) is supported on a hollow tube provide better mechanical support and stability for fiber. Subsequently, the single focusing lens in contact with the light exit side of the transmitting window enhances stability of coupling.

Figure 7:
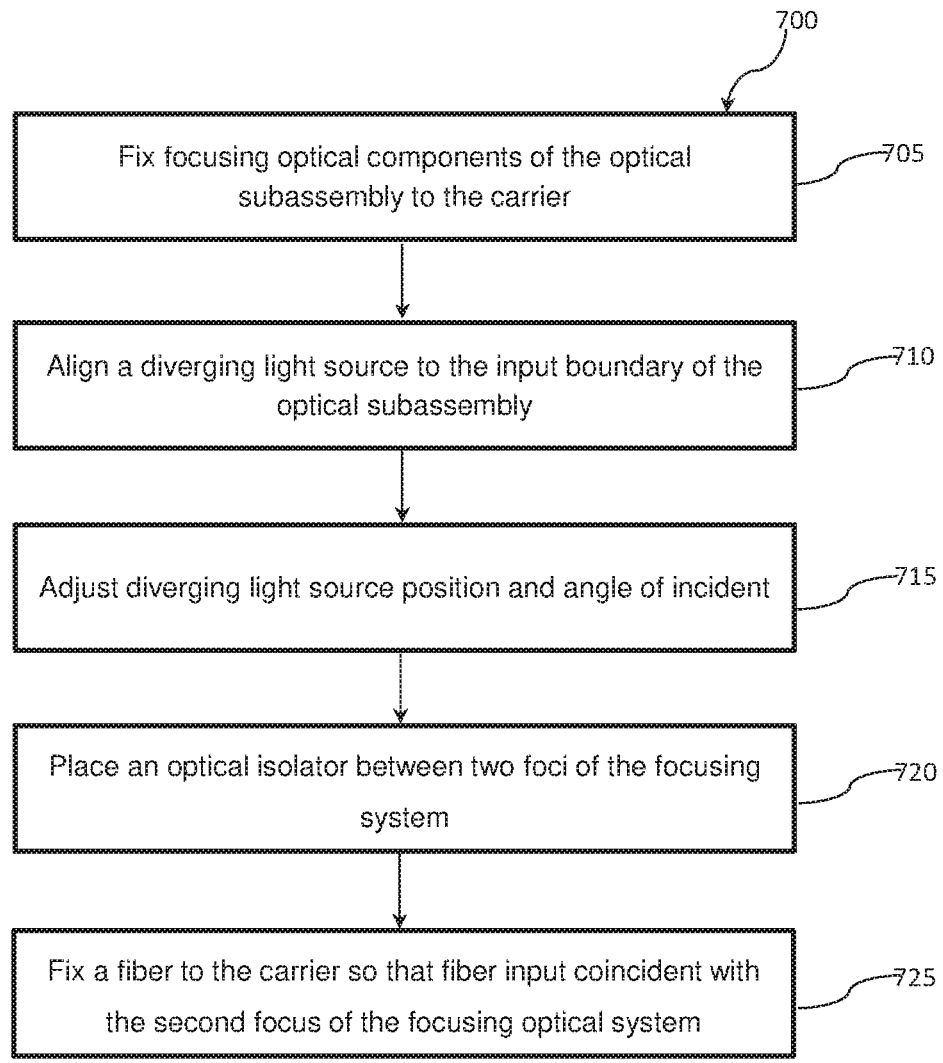
FIG. 7 is a flow chart illustrating an assembly process of an optical subassembly for nonreciprocal coupling of light from a planar optical waveguide output of a silicon photonic (SIP) to an optical fiber.

FIG. 7 is a flow chart illustrating an assembly process of an optical subassembly for nonreciprocal coupling of light from a planar optical waveguide output of a silicon photonic (SIP) to an optical fiber. The assembly process 700 starts at step 705 and proceeds to step 710. At step 705, focusing optical components of the optical subassembly are fixed to target position on the carrier. And at step 710, a diverging light source is aligned to the input boundary of the optical subassembly.

Step 710 proceeds to step 715. At step 715, the position of the diverging light source and angle of incident is adjusted so that most optical power pass through first focus and second focus of the focusing optical system.

Step 715 proceeds to step 720. At step 720, an optical isolator is positioned between two foci of the optical subassembly.

Step 720 proceeds to step 725. At step 725, a fiber is fixed to the carrier so that the optical fiber input coincident with the second focus of the optical subassembly.

In particular, the optical subassembly is operably configured to provide a low transmission loss for light travel from the planar optical waveguide output to the optical fiber.

In accordance with an embodiment of the present invention, the assembly process further includes focusing the diverging light source to an optical fiber facet center by at least one focusing element of the focusing optical system and magnifying the mode size of the planar optical waveguide output to an output waveguide of the optical fiber. In particular, the focusing optical system magnifies a mode size of the planar optical waveguide output to optimize coupling efficiency to the optical fiber.

In accordance with an embodiment of the present invention, the assembly process further includes focusing a diverging light source to an optical fiber facet center by a second focusing lens (102) and magnifying a mode size of planar output waveguide to an output waveguide of the optical fiber by a first focusing lens (101) and the second focusing lens (102) of the focusing optical system.

In accordance with an embodiment of the present invention, the assembly process further includes collecting and focusing a diverging light source to an optical fiber facet center only by a first focusing lens (101) and magnifying a mode size of planar optical waveguide output to an output waveguide of the optical fiber by configuring working distances of the first focusing lens (101) of the focusing optical system.

In accordance with an embodiment of the present invention, the assembly process further includes connecting at least one focusing element selected from the first focusing lens (101) and the second focusing lens (102) of the focusing optical system with the light-transmitting window at a light exit side and supporting the optical subassembly on a hollow tube.

In one or more embodiments of the present invention, the optical isolator may be positioned between photonic integrated circuit (PIC) output and the first focusing element to provide the same effect by matching the target performance. Since output from a photonic integrated circuit (PIC) is a polarized light, simple optical isolator made of latched garnet plate sandwiched between two polarizers can be used.

In an embodiment of the present invention, when the emission point of the output planar waveguide is located at the edge of the photonic integrated circuit (PIC) then a simple butt-joint with the optical subassembly boundary provides focusing of the light. In particular, a predetermined distance of the photonic integrated circuit (PIC) output from the edge is accommodated by the optical subassembly by shifting the input focus at a predetermined distance.

In accordance with an embodiment of the present invention, the photonic integrated circuit (PIC) output is positioned with respect to the input of optical subassembly for coupling in the communication photonic packaging. With the planer structure of photonic integrated circuit (PIC) and input boundary of the optical subassembly, optical alignment is reduced to x/y/z 3-axis from original x/y/z/pitch/roll/yaw 6-degree alignment.

In one or more embodiments of the present invention, for high volume production the optical isolator by planner process includes cutting into a rectangle dice and focusing the light beam to pass through to an output fiber facet center by the focusing optical system.

In accordance with an embodiment of the present invention, the optical subassembly further comprises a diverging light source. In particular the light output from planar waveguides is a diverging light source with mode size diameter in few micrometers. Moreover, the light source is positioned at the input focus of the optical subassembly such that a portion of the light is collected and focus to the fiber input with reduced divergence angle based on the arrangement of the optical assembly.

In accordance with an embodiment of the present invention, the carrier (107) is in anyone shape selected from a hollow tube, U-shape, an L-shape, and alike shape carrier.

It is understandable that the above mentioned hollow tube is one of a possible structure to improve the carrier support for the focuser of the focusing optical system, but other shape or complex structure, such as carrier is a hollow tube, in U-shape, L-shape, with additional guiding, alignment features, steps can be added to realize the same optical function of the focuser/focusing optical system in this invention.

In accordance with an embodiment of the present invention, the optical subassembly with a 3-micrometer mode field diameter silicon photonic (SIP) waveguide has a coupling efficiency of about 71% for 1311 nm to SMF28.

Thus, the embodiments of the present invention provide an optical subassembly for non-reciprocal coupling of light from a planar optical waveguide output to an optical fiber and an assembly process thereof. The optical subassembly integrates light coupling and optical isolation function for photonic integrated circuit (PIC) coupling to the optical fiber in single subassembly. Moreover, the optical subassembly product is compact in size, cost effective, with a simple assembly process with photonic integrated circuit (PIC) without compromising the coupling efficiency. Furthermore, the focusing element combines coupling optical assembly and free space isolator in a single optical subassembly device to deliver light from a photonic integrated circuit (PIC) to the optical fiber.

Although some features and examples herein have been described in language specific to structural features or methodological steps, it is to be understood that the subject matter herein is not necessarily limited to the specific features or steps described. Any process descriptions, elements or blocks in the flow diagrams described herein or depicted in the attached figures should be understood as potentially representing modules, segments, or portions of code that include one or more executable instructions for implementing specific logical functions or elements in the process. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components is not limited to embodiments including exactly that number of those components, unless expressly specified. However, such a claim does describe both embodiments that include exactly the specified number of those components and embodiments that include at least the specified number of those components.

What is claimed is:

1. An optical system, comprising:
a carrier which is a hollow tube;
an optical fiber capillary coaxially fixed to the hollow tube;
and
an optical subassembly for non-reciprocal coupling of light from a planar optical waveguide output to the optical fiber capillary, the optical subassembly comprising:
a focusing optical system located inside the hollow tube and consists of two foci with one focus operably coincident with the optical fiber capillary;
an optical isolator located inside the hollow tube and operably configured to transmit light unidirectionally between the two foci;
a light transmitting window outside the hollow tube and having a light input plane and a light exit side, the light transmitting window, on the light exit side, being supported on a side surface of the hollow tube, a single focusing lens of the focusing optical system being in contact with the light exit side of the light transmitting window;
an input boundary provided by the light input plane of the light transmitting window to align the optical subassembly with the planar optical waveguide output in which another focus of the two foci is operably coincident with the input boundary; and
wherein the optical subassembly is operably configured to provide a low transmission loss for the light travelling from the planar optical waveguide output to the optical fiber capillary.

2. The optical subassembly as claimed in claim 1, wherein the focusing optical system comprises at least one focusing element.

3. The optical subassembly as claimed in claim 1, wherein the optical isolator is a free-space optical isolator.

4. The optical subassembly as claimed in claim 3, wherein the optical isolator is positioned between the two foci that transmit light in one direction operate bases on magneto-optic effect.

5. The optical subassembly as claimed in claim 1, wherein the focusing optical system further comprises a C-lens, a GRIN-lens or a lensed fiber.

6. The optical subassembly as claimed in claim 1, wherein the focusing optical system magnifies a mode size of the planar optical waveguide output to optimize a coupling efficiency to the optical fiber capillary.

* * * * *